United States Patent Office 3,529,013
Patented Sept. 15, 1970

3,529,013
METHOD FOR CONTROLLING SUBLIMATION DURING THE PREPARATION OF POLYESTERS
Peter Howard Jackson, Alfred, Maine, assignor to Eastman Kodak Company, Rochester, N.Y., a corporation of New Jersey
No Drawing. Filed Mar. 2, 1967, Ser. No. 619,926
Int. Cl. C07c 69/82
U.S. Cl. 260—475         9 Claims

ABSTRACT OF THE DISCLOSURE

In a process for the manufacture of a polyester in which dimethyl terephthalate is reacted with one or more glycols in the presence of an ester interchange catalyst, incorporation in the reaction mixture of a small amount of a volatile inert organic compound in which dimethyl terephthalate is soluble serves to prevent sublimation of the dimethyl terephthalate. Plugging of condensers and other processing equipment, and consequent build-up of pressure in the reaction vessel and reduction in reaction rate, resulting from such sublimation is effectively avoided. Volatile inert organic compounds which are useful for this purpose include hydrocarbons, chlorinated hydrocarbons and ethers.

---

This invention relates to the preparation of linear superpolyesters of glycols and dicarboxylic acids having a molecular weight of at least about 15,000 and ranging upward to 100,000 or more and having an intrinsic viscosity of at least about 0.5. More particularly, this invention relates to an improved process for preparing glycol diesters of dicarboxylic acids which prevents loss of reactants and fouling of apparatus.

The preparation of polyesters by esterification or ester exchange and condensation is well known. U.S. Pat. 2,465,319 and many subsequently issued patents such as U.S. 2,727,881 described such processes in great detail. A common feature of all of the processes with which this invention is concerned is that they begin with a lower dialkyl ester of a dicarboxylic acid which is condensed with a glycol, the glycol usually being used as such although it can be used in the form of lower akanoic acid ester thereof, such esters being equivalents of the glycol. The processes with which this invention is concerned involve the initial preparation in the presence of a catalyst of a substantially monomeric protopolymer under conditions facilitating removal of the lower alkanol formed from said lower dialkyl ester by ester interchange with said glycol. This is sometimes referred to as the first stage of the polyester preparation and can be conducted under a variety of conditions using many different types of apparatus. For example, the lower dialkyl ester and the glycol in a mole ratio beginning at about 1 to 1.5 up to 1 to 10 can be placed in a reaction vessel equipped with a packed column with the vessel being heated at a temperature which permits the lower alkanol to pass through the column, the glycol being retained by the column and returned to the reaction vessel whereby substantially all of the lower alkanol which can theoretically be produced is removed during this first stage of the polyester preparation which results in a monomeric protopolymer.

The second stage of the polyester preparation involves taking the monomeric protopolymer produced during the first stage and causing such protopolymer molecules to undergo a further ester interchange reaction whereby the superfluous quantities of glycol are removed and long chain polyester molecules are produced. The polymerization of the protopolymer is accomplished under conditions facilitating removal of superfluous quantities of said glycol so that the ultimate ratio of bifunctional dicarboxylic acid moieties to glycol moieties is essentially one to one in the polymer molecule.

The degree of polymerization is proportionate to the intrinsic viscosity of the polyester. A convenient solvent for measuring the intrinsic viscosity is a mixture of 60% phenol and 40% tetrachloroethane. The same intrinsic viscosity for different polyesters does not necessarily represent the same molecular weight. The highly polymeric polyesters correspond to an intrinsic viscosity of at least 0.5 for poly(ethylene terephthalate). Other polyesters having the same molecular weight may have higher or lower intrinsic viscosities indicative of said minimum molecular weight. As a broad generalization it is desired that the polyesters especially useful for preparing fibers and film have an intrinsic viscosity of about 0.5 or higher.

The polymerization of the protopolymer is generally accomplished during the earlier phases by heating at a temperature above the boiling point of the glycol at whatever pressure is used so that the glycol can be readily removed by a suitable condenser or other device attached to the reaction vessel.

The catalysts which may be used in the preparation of polyesters, such as described above, include organic and inorganic compounds of metals such as titanium, manganese, antimony, zinc, tin, lead, calcium, cobalt, lithium, combinations thereof, etc., heretofore utilized by those skilled in the art. The prior art, for example, discloses a great number of such catalysts, some of which are described in patents such as U.S. 2,465,319, U.S. 2,720,502, U.S. 2,727,881 and others. Specific catalysts heretofore known and which may be utilized include tetraisopropyl titanate, titanium dioxide, zinc acetate, zinc acetyl acetonate, lead oxide, calcium oxide, lithium ethoxide, antimony trioxide, manganese acetate and the like. Generally, the acetates, chlorides, nitrates, sulfates, oxides and alkoxides of one or more of the metals zinc, manganese, tin, lead, titanium, antimony, cobalt and lithium are preferred. For example, the catalyst system of zinc acetate and tetraisopropyl titanate or antimony trioxide is well-suited to attain the desired reaction activity. The catalyst is generally utilized in a concentration of from about 0.002 percent to about 0.2 percent by weight of the reactants being condensed. Higher or lower percentages can also be employed. Generally from about 0.001 percent to about 0.05 percent catalyst can be advantageously employed.

Glycols which are used in the ester interchange reaction are exemplified by such compounds as ethylene glycol, 1,3-propanediol, 1,4-butanediol, 2,2-dimethyl-1,3-propanediol, 1,4-cyclohexanedimethanol and the like or combinations thereof. The glycol is usually added in a concentration of from about 1.0 to about 10 moles per mole of the dicarboxylic acid ester.

In the past, a continuing problem in the preparation of polyesters and, specifically, in the preparation of the glycol diester, has been the sublimation of dimethyl terephthalate during the ester interchange reaction. Such sublimation sometimes causes the condenser system to become stopped up and thereby causes the generation of dangerous excess pressure in the reaction vessel and loss of reaction rate.

In accordance with the method of this invention, it has now been found that the problem of dimethyl terephthalate sublimation can be eliminated.

A primary object of this invention is to prevent the caking and plugging of condenser and/or other cooling equipment that is ordinarily caused by dimethyl terephthalate (DMT) during a conventional ester interchange reaction.

The above object and other objects which will become apparent to those skilled in the art are attained by the practice of the improved process of this invention which, briefly, comprises reacting a dimethyl terephthalate with one or more glycols in the presence of an ester interchange catalyst and a very small amount of an inert volatile organic compound which is an effective solubilizer for dimethyl terephthalate. This material will herein be referred to as the "volatile DMT solubilizer" of the present invention.

The inert volatile organic DMT solubilizers of the present invention which are utilized in small amounts to overcome the problems set out above (during the ester interchange reaction) must not only be able to dissolve DMT at the temperature at which they boil (i.e., preferably at least about 10 weight percent of DMT should be dissolvable in the hot material), but they must also have boiling points which fall within the range of about 125° C. to about 250° C. at atmospheric pressure and must contain no functional groups capable of reaction with the dimethyl terephthalate or the glycol(s) present in the reaction mixture.

The range within which the boiling points of the inert organic compounds falls is important, since the ester interchange reaction for poly(ethylene terephthalate), for example, is normally run at a temperature of from about 145° C. to about 225° C. Thus, compounds boiling above about 125° C. would begin to distill at temperatures somewhat below about 145° C., depending on the purity of the compound and depending on the materials with which it is associated during the reaction. Further, the temperature in the reactor must be raised at the conclusion of the ester interchange reaction in order to remove unreacted ethylene glycol (B.P. 196° C.) and any remaining inert organic compounds of this invention, and it is desirable that the temperature not be elevated drastically at this point since temperatures higher than about 250° C. could result in detriment to the product. Finally, it is desirable that the inert organic compound and excess glycol are removed from the reaction zone as separate entities (i.e., preferably the inert organic compound should not be of the type that forms a constant boiling mixture with the glycol), since distillation of the inert organic compound as an azeotropic or constant boiling mixture with the excess glycol tends to retard the reaction to some extent, and premature removal of the glycol interferes with the reaction generating the monohydric alcohol.

Exemplary classes of inert organic compounds which meet the above requirements include, among others, hydrocarbons, chlorinated hydrocarbons, and ethers. Illustrative examples of compounds of the above classes include diethylketone, methylpropylketone, methylbutylketone, methylisobutylketone, dipropylketone, methyl n-amyl ketone, diisobutylketone, methyl n-hexylketone, cyclohexanone, methylcyclohexanone, acetonylacetone toluene, xylenes, hi-flash naphtha, V.M. & P. naphtha, cyclohexane, tetrahydronaphthalene, decahydronaphthalene, Solvesso No. 2, Solvesso No. 3, Safe T-Esso, monochlorobenzene, orthodichlorobenzene, butyl ether, dichloroethyl ether, trichloropropanes, phenylmethylether, ethylbenzene, pentachloroethane, dichloroethylethers, monochlortoluenes, dichlorobenzenes, dibutylketone, 2-ethylhexyl chloride, trichloroethane, and diisopropyl ether.

The inert volatile DMT solubilizers utilized in the processes of this invention are used in very small amounts. Preferably, the compounds are added in concentrations of from about 1 percent to about 3 percent by weight of the reactants, although concentrations as low as about 0.5 percent by weight can be advantageously employed. The actual amount that is utilized for optimum beneficial results will vary somewhat, depending upon the particular geometry of the reactor and condenser system being utilized, since it is most desirable to use just enough of the "volatile DMT solubilizer" to be practically completely volatilized in the gaseous portion of the system when the reaction temperature is about 220° C. Thus, enough "volatile DMT solubilizer" is available in the atmosphere over the reaction mass to maintain a steady, relatively slow refluxing of the "volatile DMT solubilizer" in the condenser (to thereby maintain the condenser essentially free of solid DMT), and the reaction mixture itself is not significantly diluted by the inert material (so its presence in the reactor in such very small quantities does not significantly decrease the rate of the desired ester exchange reaction).

According to a preferred embodiment of this invention there is provided an improved process for preparing a glycol diester of terephthalic acid which comprises (1) forming a mixture consisting essentially of (a) dimethyl terephthalate, (b) from 1.0 to 10 mole proportions of at least one glycol selected from the group consisting of ethylene glycol, 1,3-propanediol, 1,4-butanediol, 2,2-dimethyl-1,3-propanediol or 1,4-cyclohexanedimethanol (c) from about 0.5 to about 4 (preferably from about 1 to about 3) percent by weight of the total mixture of an inert volatile orpanic compound containing no functional groups capable of reacting with dimethyl terephthalate or the glycols, having a boiling point within the range of about 125° C. to about 250° C. at atmospheric pressure, and being capable of dissolving at least about 10 weight percent of DMT at its boiling temperature, (d) from about 0.002% to about 0.2% by weight of ester exchange catalyst(s); (2) heating the mixture at a temperature within the range of from about 145° C. to about 225° C. (sufficient to remove methanol while refluxing the inert volatile organic DMT solubilizer); and (3) after substantially all of the methanol has been removed, heating at a higher temperature to remove substantially all of the inert volatile organic DMT solubilizer and unreacted glycol.

This invention is further illustrated by the following examples, although it is to be understood that these examples are included merely for purposes of illustration and are not intended to limit the scope of the invention unless otherwise indicated.

EXAMPLE 1

In a stainless steel resin flask are placed 776 g. (4.0 moles) of dimethyl terephthalate, 412 g. (6.6 moles) of ethylene glycol, 30 milliliters of xylene, and 10.9 milliliters of catalyst solution composed of 7.8 milliliters of a 5% solution of zinc acetate in ethylene glycol and 3.1 milliliters of a 10% solution of tetraisopropyltitanate in ethylene glycol. The top is fastened to the resin flask and the flask immersed in a molten salt bath maintained at 200° C. A fractionation column (22 cm. long, 3 cm. in diameter, packed with stainless steel protruded packing) and a total condensation variable takeoff head is then inserted in one of the necks of the flask. A thermocouple well is inserted in another neck of the flask, the stirrer in the center neck and a stopper in the remaining neck. When the temperature of the contents of the flask reaches about 175° C. methanol begins to appear at the top of the column. It is at this point that sublimation ordinarily becomes troublesome; the xylene present in the column eliminates it completely. The take-off rate is adjusted to keep the temperature at the top of the column at 65° C. When the theoretical amount of methanol (162.5 ml.) has been collected the ester exchange reaction is complete. The low molecular weight poly(ethylene terephthalate) so prepared can then be polymerized further in the usual way.

EXAMPLE 2

In the stainless steel resin flask are placed 776 g. (4.0 moles) dimethyl terephthalate, 29 g. (0.2 mole) cyclohexanedimethanol, 412 g. (6.6 moles) of ethylene glycol, 20 ml. of trichloropropane, 0.17 g. zinc acetate dihydrate, and 0.23 g. antimony oxide. The flask is assembled as before, but in this example the take-off is automatically controlled by means of a solenoid-operated valve activated by a thermocouple in the condensing vapor, and adjusted to close when the condensation temperature exceeds 70° C. The reaction is conducted as before to give a low molecular weight copolymer, which can be further polymerized in the usual way. The presence of trichloropropane completely eliminates dimethyl terephthalate sublimation.

Although the invention has been described in considerable detail with reference to certain specific embodiments thereof, it will be understood that variations and modifications can be effected without departing from the spirit and scope of the invention as set forth in the specification and defined in the appended claims.

We claim:

1. A process for preparing a glycol diester of terephthalic acid comprising (1) forming a mixture consisting essentially of (a) dimethyl terephthalate, (b) from about 1.0 to about 10 mole proportions of at least one glycol selected from the group consisting of ethylene glycol, 1,3-propanediol, 1,4-butanediol, 2,2-dimethyl-1,3-propanediol and 1,4-cyclohexanedimethanol, (c) a catalytically effective amount of an ester interchange catalyst, and (d) from about 0.5 to about 4 percent by weight of the total mixture of an inert volatile organic DMT solubilizer which is selected from the class consisting of hydrocarbons, chlorinated hydrocarbons and ethers, which has a boiling point within the range of from about 125° C. to about 250° C., is capable of dissolving dimethyl terephthalate when at said boiling point, and is free of functional groups which react with dimethyl terephthalate or glycol present in said mixture; (2) heating said mixture at from about 145° C. to about 225° C. in order to simultaneously remove methanol and reflux said inert volatile organic DMT solubilizer; (3) removing substantially all of said methanol; and (4) heating said mixture at a higher temperature to thereby remove substantially all of said inert volatile organic DMT solubilizer and unreacted glycol from the resulting reaction product.

2. A process as in claim 1, wherein said inert volatile organic DMT solubilizer is xylene.

3. A process as in claim 1, wherein said inert volatile organic DMT solubilizer is trichloropropane.

4. A process as in claim 1, wherein said glycol is ethylene glycol.

5. A process as in claim 4, wherein said inert volatile organic DMT solubilizer is xylene.

6. A process as in claim 4, wherein said inert volatile organic DMT solubilizer is trichloropropane.

7. A process as in claim 4, wherein said inert volatile organic DMT solubilizer is methylisobutyl ketone.

8. A process as in claim 4, wherein said inert volatile organic DMT solubilizer is tetrahydronaphthalene.

9. A process as in claim 4, wherein said inert volatile organic DMT solubilizer is o-dichlorobenzene.

References Cited

UNITED STATES PATENTS

| | | |
|---|---|---|
| 3,056,817 | 10/1962 | Werber et al. _____ 260—475 |
| 2,894,021 | 7/1959 | Siggel. |
| 3,420,801 | 1/1969 | Fitz. |

LORRAINE A. WEINBERGER, Primary Examiner

E. J. SKELLY, Assistant Examiner

U.S. Cl. X.R.

260—75